June 30, 1925.

W. R. DODGE 1,544,227

APPARATUS FOR ELECTRODEPOSITION OF PRECIOUS ORES

Filed Nov. 26, 1923  2 Sheets-Sheet 2

INVENTOR,
Winthrop Rufus Dodge
By, Frederick E. Bromby
ATTY.

Patented June 30, 1925.

1,544,227

UNITED STATES PATENT OFFICE.

WINTHROP RUFUS DODGE, OF TIMMINS, ONTARIO, CANADA.

APPARATUS FOR ELECTRODEPOSITION OF PRECIOUS ORES.

Application filed November 26, 1923. Serial No. 677,037.

*To all whom it may concern:*

Be it known that I, WINTHROP RUFUS DODGE, a citizen of the United States of America, and resident of the town of Timmins, in the Province of Ontario, in the Dominion of Canada, have invented new and useful Improvements in Apparatus for Electrodeposition of Precious Ores, of which the following is a specification.

The invention relates to apparatus for electrodeposition of precious ores as described in the present specification and shown in the accompanying drawings that form part of the same.

The invention relates to an apparatus by means of which precious ores, chiefly gold and silver, are deposited directly from a solution of concentrates, either with or without filtration, and has for its object provisions whereby the extraction of such precious ores is both facilitated and expedited.

The invention consists essentially of a vessel provided with an inlet for admission of a cyanide solution of concentrates and an outlet for the escape of the residue thereof, a series of electrodes composed of alternate anodes and cathodes interposing the inlet and outlet and connected to a source of electricity so as to deposit the precious ores of the solution by passage of a current therethrough. The invention also provides for rotating the cathodes to constantly agitate the solution during treatment and for the removal of such cathodes as a unit to effect stripping of the deposits therefrom by acids or alkali as customary in the art.

Referring to the drawings, Figure 1 is a vertical sectional view of the invention.

Like numerals of reference indicate corresponding parts throughout the figures in the drawings.

Figure 1:
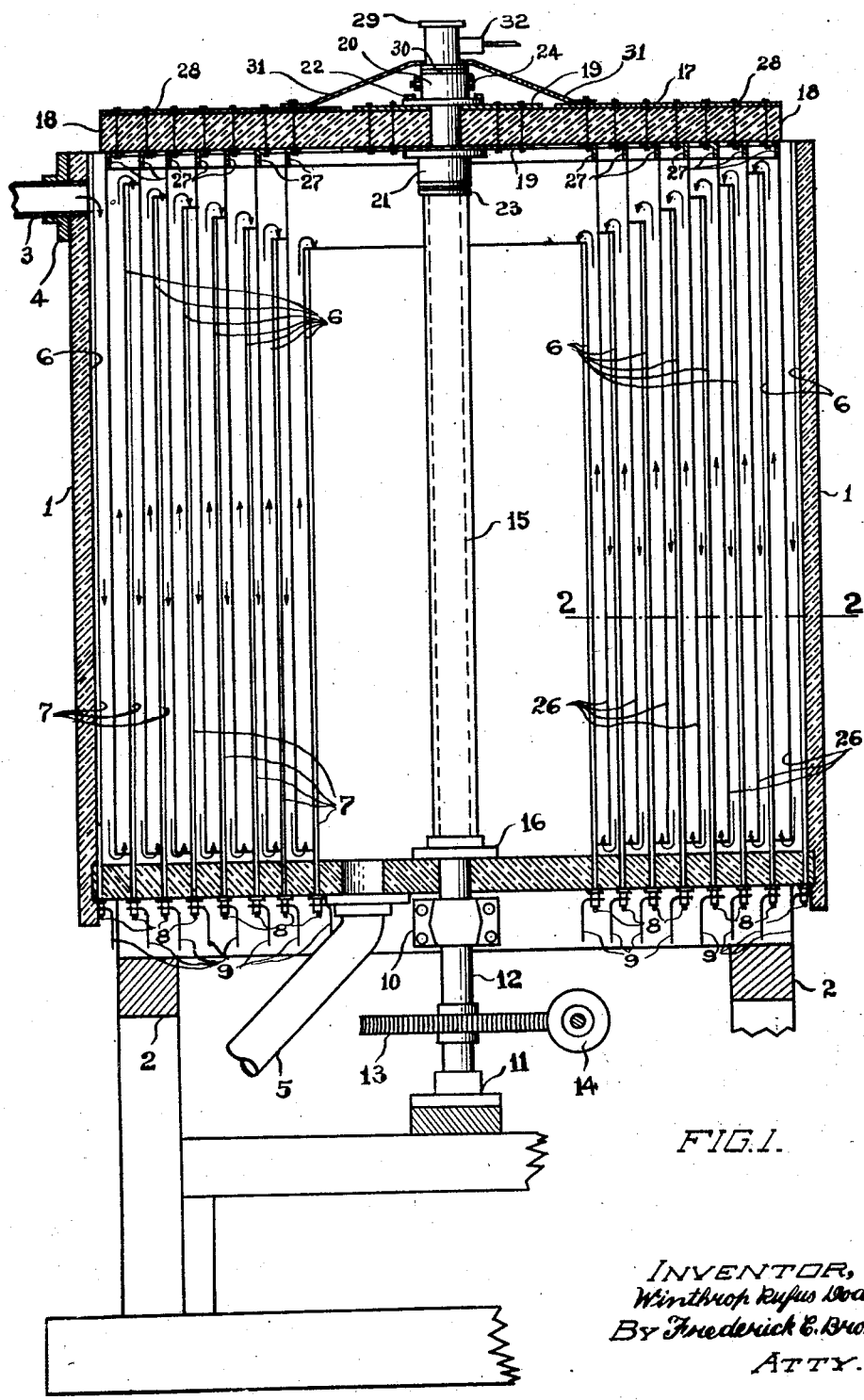
Figure 2:
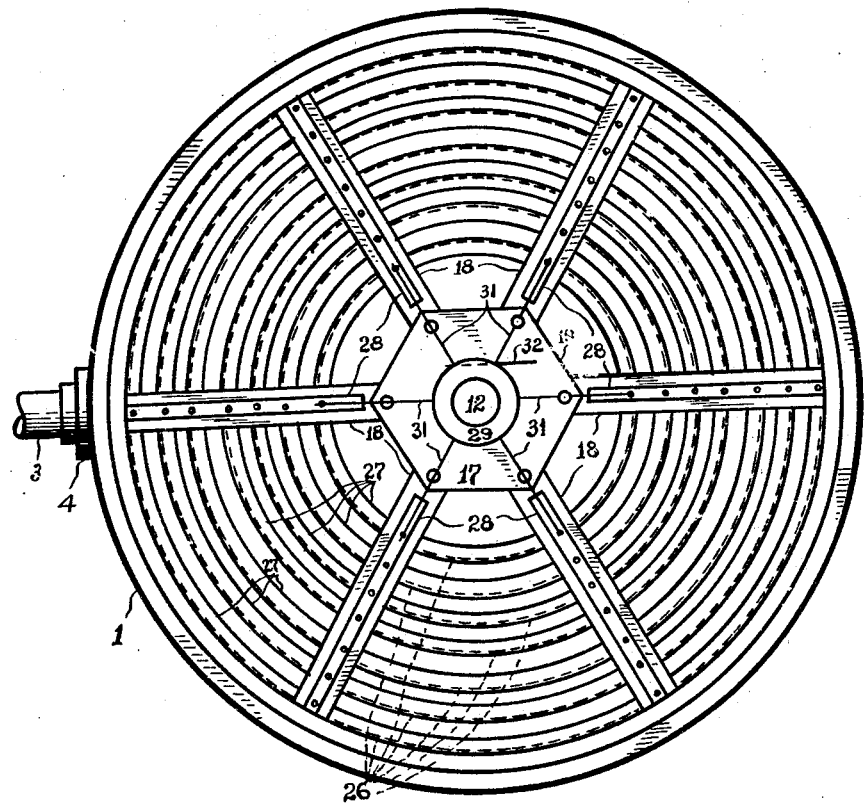
Figure 2 is a top plan view thereof.
Figure 3:
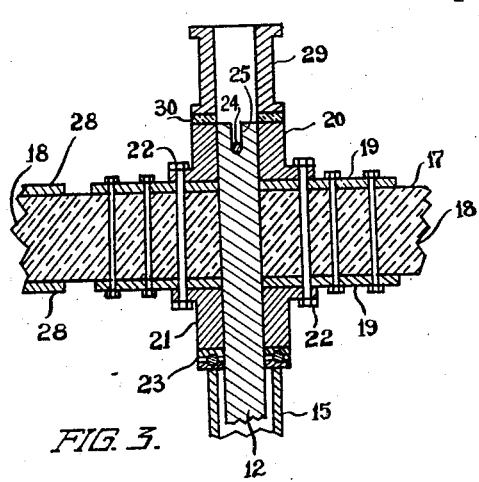
Figure 3 is a fragmentary detail of the spider.
Figure 4:
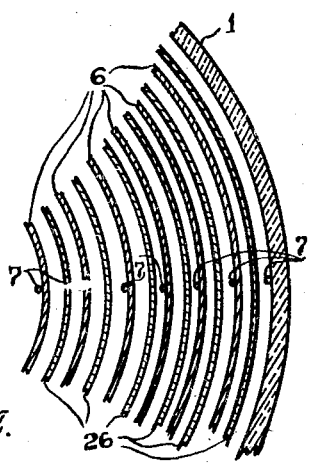
Figure 4 is a partial sectional view taken on the line 2—2 of Figure 1 illustrating the electrodes.

In the drawings, 1 designates a circular vessel of suitable capacity constructed of a non-conductive material and being supported upon a substantial frame 2 of convenient shape and form.

3 is a lateral ingress comprising a pipe extending from a cyaniding receptacle, not shown in the drawings as it does not constitute a feature of the present invention, to the vessel 1 and affixed thereto by a flange 4, by which means a cyanide solution of concentrates is conveyed to the vessel for treatment.

5 is an egress comprising a pipe similarly affixed to the vessel, at its bottom, and extending back to the cyaniding receptacle or to a waste, thereby conducting the residue of the solution from the vessel.

6 are a series of anodes consisting of concentric cylinders, constructed of soft steel, and resting upon the vessel bottom, said cylinders gradually decreasing in height towards their common centre.

7 are vertical rods disposed at intervals around each of the electrodes 6 and secured thereto, the lower ends of such rods being embedded in the vessel bottom with their extremities protruding through the same, thereby forming terminals 8 which are secured to conducting wires 9 for conducting electrical current thereto.

10 and 11 are vertically aligned bearings coaxial with the vessel 1 and subjacent thereto, such bearings being secured to the frame 2 by bolts or other convenient fastening means.

12 is a vertical shaft journalled in said bearings and extending through the vessel 1 to its upper end, said shaft being provided with a worm gear 13 meshing with a worm 14, which in turn is connected to a source of power in order that the shaft may be driven by such gearing.

15 is a stationary tube encasing the shaft 12 and rigidly secured to the vessel bottom by a flange 16, the upper end of said tube terminating short of the shaft end.

17 is a spider mounted upon the upper end of the shaft 12 comprising a plurality of radial arms 18 equidistant from one another, of a non-conducting material and rigidly secured by plates 19, and having an upper flange 20 and a lower flange 21 secured by bolts 22.

23 is a thrust ball bearing interposing the upper end of the tube 15 and the lower spider flange 21 for the purpose of diminishing friction of such contacting parts.

24 is a substantial bolt transversely arranged in the upper spider flange 20 and passing through a slot 25 in the shaft 12 thereby forming a key to prevent independent rotation of the spider 17 and yet allowing its removal from the vessel without removing of the bolt.

26 are a series of cathodes consisting of concentric cylinders, constructed of iron coated with zinc or other suitable material, and depending from the spider 17; the individual cathodes each being disposed intermediate of the successive anodes 6, thereby forming alternate anodal and cathodal electrodes.

27 are L-shaped annuli, rigidly secured by bolts to the several spider arms 18 and to the respective cathodes 26, such annuli being provided for the purpose of effecting the suspension of the electrodes.

28 are metallic straps, forming conductors, secured on the arms 18 by the bolts which connect the annuli 27 thereto.

29 is a commutator coaxial with the shaft 12 and secured to the spider 17, such commutator being insulated from the spider and shaft by an interposed number 30.

31 are conductors connecting the commutator 29 to the straps 28, and 32 is a brush held in engagement with said commutator, such brush being connected to the other part of the electric circuit to that of the wires 9.

In the operation of this invention, the worm 14 is rotated, which in turn revolves the shaft 12, and as the spider 17 is keyed thereto same revolves as a unit together with its cathodes 26.

Upon switching on of the current the power passes through the conductors to the anodes 6 and upon completion of the circuit passes through to the cathodal electrodes 26.

A cyanide solution of precious ores is admitted through the ingress 3 into the vessel 1, filling the annular space formed by the two outermost anodes, passing therefrom, as indicated by the arrows in the drawing, into the other annular spaces until it finally reaches the interior of the innermost anode, from whence it passes through the egress 5 from the vessel. The rotation of the cathodes 26 maintains the solution in a constant state of agitation, whereas the electric current deposits the precious ores upon the cathodes, from which such deposits are subsequently removed.

What I claim is:—

1. In a device of the class described, a vessel having an ingress and an egress, a plurality of anodes comprising concentric cylinders affixed to the vessel bottom and gradually decreasing in height towards their common centre, a plurality of cathodes comprising concentric cylinders depending from a spider; the individual cathodes each being disposed intermediate of the successive anodes forming alternate anodes and cathodes; means to conduct electric power to and from the electrodes, and means to rotate the spider to agitate a solution during its passage through the vessel.

2. In a device of the class described, a vessel, a lateral ingress thereto communicating with a source of supply, an egress centrally of the vessel, a plurality of anodes comprising cylinders affixed to the vessel bottom and gradually decreasing in height towards their common centre, a plurality of cathodes comprising concentric cylinders suspended short of said vessel bottom and intermediate of the successive anodes forming alternate positive and negative electrodes, means to conduct electric power to and from the electrodes, a spider affixed to the cathodes thereof, a shaft journalled in the vessel and keyed to said spider, a tube encasing said shaft, and means to drive the same for the purpose of rotating the cathodes.

3. In a device of the class described, a vessel, a lateral ingress communicating with a source of supply, an egress centrally of the vessel, a plurality of anodes comprising cylinders affixed to the vessel bottom and gradually decreasing in height towards their common centre, a plurality of cathodes comprising concentric cylinders suspended short of said vessel bottom and intermediate of the successive anodes forming alternate positive and negative electrodes, means to conduct electric power to and from the electrodes, a spider affixed to the cathodes thereof, a shaft journalled in the vessel and keyed to said spider, a tube encasing said shaft, a worm gear rigidly affixed to said shaft, a worm meshing with the worm gear, and means to drive same.

4. In a device of the class described, a vessel, a lateral ingress thereto communicating with a source of supply, an egress centrally of the vessel, a plurality of anodes comprising cylinders affixed to the vessel bottom and gradually decreasing in height towards their common centre, a plurality of cathodes comprising concentric cylinders suspended short of said vessel bottom and intermediate of the successive anodes forming alternate positive and negative electrodes, means to conduct electric power to and from the electrodes, means to support and rotate the cathodes, a commutator carried thereby coaxially; conductors connected to said commutator and the several cathodes, a brush, and electrical connections between the brush and the anodes.

Signed at Timmins, Ontario, Canada, this 10th day of November, 1923.

WINTHROP RUFUS DODGE.

Witnesses:
W. S. MACPHERSON,
DAYTON OSTROSSER.